United States Patent
Okamoto et al.

(10) Patent No.: US 9,499,656 B2
(45) Date of Patent: Nov. 22, 2016

(54) URETHANE-BASED OPTICAL MEMBER AND METHOD FOR PRODUCING SAME

(71) Applicant: HOYA CORPORATION, Shinjyuku-ku (JP)

(72) Inventors: Yasuhisa Okamoto, Hochiminh (VN); Masahisa Kousaka, Nishitama-gun (JP)

(73) Assignee: HOYA CORPORATION, Tokyo (JP)

( * ) Notice: Subject to any disclaimer, the term of this patent is extended or adjusted under 35 U.S.C. 154(b) by 0 days.

(21) Appl. No.: 14/407,209

(22) PCT Filed: Jun. 12, 2013

(86) PCT No.: PCT/JP2013/066266
§ 371 (c)(1),
(2) Date: Dec. 11, 2014

(87) PCT Pub. No.: WO2013/187449
PCT Pub. Date: Dec. 19, 2013

(65) Prior Publication Data
US 2015/0166718 A1  Jun. 18, 2015

(30) Foreign Application Priority Data

Jun. 12, 2012 (JP) ................................. 2012-132854

(51) Int. Cl.
| | |
|---|---|
| G02B 1/04 | (2006.01) |
| C08G 18/73 | (2006.01) |
| C08G 18/76 | (2006.01) |
| C08G 18/79 | (2006.01) |
| C08G 18/38 | (2006.01) |
| C08G 18/83 | (2006.01) |
| C08G 18/08 | (2006.01) |
| C09D 175/04 | (2006.01) |
| C08G 18/34 | (2006.01) |
| C08G 101/00 | (2006.01) |

(52) U.S. Cl.
CPC ........... *C08G 18/73* (2013.01); *C08G 18/0819* (2013.01); *C08G 18/346* (2013.01); *C08G 18/3874* (2013.01); *C08G 18/3876* (2013.01); *C08G 18/7621* (2013.01); *C08G 18/7671* (2013.01); *C08G 18/79* (2013.01); *C08G 18/798* (2013.01); *C08G 18/837* (2013.01); *C09D 175/04* (2013.01); *G02B 1/04* (2013.01); *C08G 2101/00* (2013.01)

(58) Field of Classification Search
CPC .......... C08G 18/7621; C08G 18/7671; C08G 18/79; C08G 18/798; G02B 1/04
See application file for complete search history.

(56) References Cited

U.S. PATENT DOCUMENTS

| | | | |
|---|---|---|---|
| 2004/0024165 A1* | 2/2004 | Yoshimura | ............. C08G 75/04 528/44 |
| 2009/0030170 A1 | 1/2009 | Ryu et al. | |
| 2010/0292430 A1† | 11/2010 | Ryu | |
| 2011/0034660 A1 | 2/2011 | Ryu et al. | |
| 2014/0243496 A1 | 8/2014 | Kousaka et al. | |

FOREIGN PATENT DOCUMENTS

| | | |
|---|---|---|
| EP | 2 075 271 A1 | 7/2009 |
| EP | 2 660 262 A2 | 11/2013 |
| JP | 2006-162926 A | 6/2006 |
| JP | 2010-83773 | 4/2010 |
| JP | 2010-083773 A † | 4/2010 |
| JP | 2013-60488 | 4/2013 |
| WO | WO 2006/109765 A1 | 10/2006 |
| WO | WO 2009/098887 | 8/2009 |
| WO | WO 2011/016229 A1 | 2/2011 |
| WO | WO 2013/027707 A1 | 2/2013 |

OTHER PUBLICATIONS

English Translation of JP-2010083773.*
Determination of technical grade isocyanates used in the production of polyurethane plastics. Skarping et al. J.Enviro. Monit., 2004, 6, 606-614.*
Third Party Observation. Communication Pursuant to Rule 114(2) EPC issued on Jul. 22, 2015, in corresponding European patent Application No. 13804459.9.
Japan Urethane Raw Materials Association, "Guide of Heating and Fusing Diphenylmethane Diisocyanate (MDI)", Published on Feb. 2012.
C. Hepburn, "Polyurethane Elastomers Second Edition," *Elsevier Applied Science*, (1992) pp. 11-13 and 247-248.
International Search Report issued Sep. 3, 2013, in PCT/JP13/066266 filed Jun. 12, 2013.
Dec. 1, 2015 Extended European Search Report issued in European Patent Application No. 13804459.9.
Hepburn, Claude. "Polyurethane Elastomers". 2nd Edition, pp. 11-13 and 247-248, 1992.
Yijun Liu, "Handbook of Polyurethane Raw Material and Addictives," Chemical Industry Press, pp. 9-10.
Guide to Heating and Fusing Diphenylmethane Diisocyanate (MDI), Selected sections of pp. 1-4, Feb. 2012, Japan Urethane Raw Materials Association.†
Hepburn, C., Polyurethane Elastomers, Selected sections of pp. 10-13 and 246-249, Second Edition 1992, Elsevier Science Publishers, Ltd.†

\* cited by examiner
† cited by third party

*Primary Examiner* — Michael L Leonard
(74) *Attorney, Agent, or Firm* — Oliff PLC

(57) ABSTRACT

Provided are a urethane optical member that has excellent transparency without turbidity or fog and a high refractive index, and a method for producing the same. A urethane optical member including at least one kind of structures represented by the formula (1) or (2) in a structure constituting the optical member, and a method for producing the same.

7 Claims, No Drawings

URETHANE-BASED OPTICAL MEMBER AND METHOD FOR PRODUCING SAME

TECHNICAL FIELD

The present invention relates to a urethane optical member and a method for producing the same. More specifically, the present invention relates to a urethane optical member that has excellent transparency without turbidity or fog and a high refractive index, and a method for producing the same.

BACKGROUND ART

A polythiol compound and a polyisocyanate compound have been commonly used as raw materials of a urethane optical member. An aromatic polyisocyanate compound in the polyisocyanate compound is being produced in large quantities inexpensively and may contribute to enhancement of the refractive index, and thus an aromatic polyisocyanate is preferred as a raw material of a urethane optical member which particularly requires a high refractive index. In particular, 4,4'-diphenylmethane diisocyanate (which may be abbreviated as MDI), and 2,4-tolylene diisocyanate and 2,6-tolylene diisocyanate (which may be abbreviated as TDI) are useful as a raw material monomer of an optical member having a high refractive index from the standpoint that these compounds are easily available industrially and facilitate enhancement of the refractive index.

For example, PTL 1 describes the use of a thiol compound having a particular structure with an aromatic polyisocyanate compound as raw materials for a polymerizable composition used for an optical resin capable of achieving a high refractive index, and 2,4-tolylene diisocyanate and 4,4'-diphenylmethane diisocyanate are used in the examples and comparative examples thereof.

CITATION LIST

Patent Literature

PTL 1: JP-A-2010-83773

SUMMARY OF INVENTION

Technical Problem

However, MDI and TDI are compounds rich in reactivity, and for example, a part of the isocyanate group thereof may be reacted with water contained in the air to form an amine, and the amine may be reacted with another isocyanate group of another molecule to form a urea bond, which forms a compound bonding molecules each other via a urea bond.

Accordingly, in the case where the amount of MDI and TDI added is increased associated with increase of the refractive index desired with respect to an optical member to a value exceeding approximately 1.65, the resulting optical member may be liable to have turbidity and fog, which are considered to be formed due to deposition of the compound bonding via a urea bond, and thus a problem of deteriorated transparency may occur.

MDI and TDI are considered to form the compound bonding molecules each other via a urea bond as described above, and the amount of MDI and TDI used is preferably small from the standpoint of the transparency of the resulting optical member, but MDI and TDI are necessarily used in at least a certain amount from the standpoint of achievement of a high refractive index. Therefore, it is difficult to achieve both a high refractive index and transparency simultaneously by using MDI and TDI. In particular, a plastic lens requiring high-level transparency is demanded to have a high refractive index and excellent transparency, and thus the use of MDI and TDI therein is restricted due to the problem.

In view of the problem, an object of the present invention is to provide a urethane optical member that has excellent transparency without turbidity or fog and a high refractive index even though MDI or TDI containing the compound bonding molecules each other via a urea bond is used as a raw material, and to provide a method for producing the same.

Solution to Problem

As a result of earnest investigations made by the present inventors, it has been found that the object may be achieved in such a manner that the compound bonding molecules each other via a urea bond contained in MDI or TDI are dissolved in a polyisocyanate compound as a raw material, and then reacted with a polythiol compound, and thereby the compound is incorporated in the structure constituting the optical member, and thus the present invention has been accomplished.

The present invention thus provides urethane optical members and methods for producing the same shown below.

1. A urethane optical member including at least one kind of structures represented by the following formula (1) or (2) in a structure constituting the optical member:

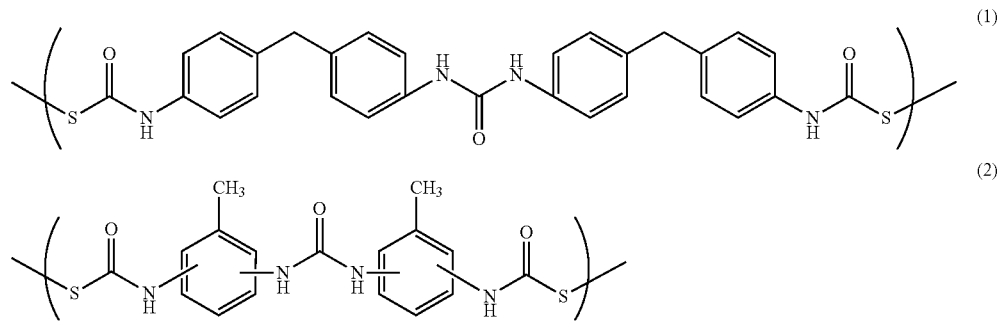

2. The urethane optical member according to the item 1, wherein the urethane optical member is obtainable by polymerization of a monomer composition containing at least one kind selected from (i) 4,4'-diphenylmethane diisocyanate and a compound represented by the following formula (1-1) and (ii) tolylene diisocyanate and a compound represented by the following formula (2-1), and a polythiol compound, and a content of at least one kind selected from the compound represented by the formula (1-1) and the compound represented by the formula (2-1) is 0.0005% by mass or more of the monomer composition:

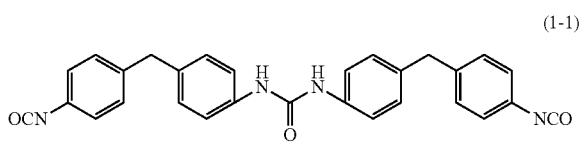

(1-1)

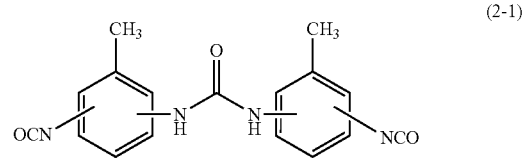

(2-1)

3. A method for producing a urethane optical member, including polymerizing a monomer composition containing at least one kind selected from (i) 4,4'-diphenylmethane diisocyanate and a compound represented by the following formula (1-1) and (ii) tolylene diisocyanate and a compound represented by the following formula (2-1), and a polythiol compound, Wherein the method includes reacting at least one kind selected from the compound represented by the formula (1-1) and the compound represented by the formula (2-1) with the polythiol compound:

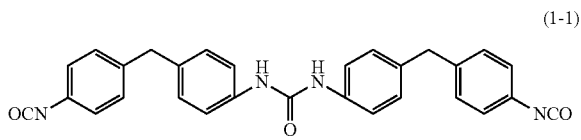

(1-1)

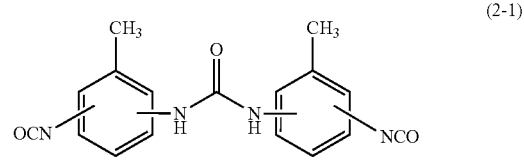

(2-1)

4. The method for producing a urethane optical member according to the item 3, wherein a content of the compound represented by the formula (1-1) in the item (i) is 0.001% by mass or more, or a content of the compound represented by the formula (2-1) in the item (ii) is 0.001% by mass or more.

5. The method for producing a urethane optical member according to the item 3 or 4, wherein the method further includes dissolving at least one kind selected from the compound represented by the formula (1-1) and the compound represented by the formula (2-1).

6. The urethane optical member according to the item 2, wherein at least one kind selected from the compound represented by the formula (1-1) and the compound represented by the formula (2-1) is made into a dissolved state and is polymerized.

7. The method for producing a urethane optical member according to the item 3, wherein at least one kind selected from the compound represented by the formula (1-1) and the compound represented by the formula (2-1) is made into a dissolved state and is reacted with the polythiol compound.

8. The method for producing a urethane optical member according to the item 5, wherein the dissolving step is performed before the reacting step.

9. A plastic lens including the urethane optical member according to any one of the items 1, 2 and 6.

10. Use of the urethane optical member according to any one of the items 1, 2 and 6, for producing a plastic lens.

Advantageous Effects of Invention

The urethane optical member of the present invention contains a compound bonding molecules each other via a urea bond of MDI or TDI in the structure constituting the optical member through a covalent bond, and therefore the urethane optical member thus provided has excellent transparency without turbidity or fog and a high refractive index. In particular, the transparency and the high refractive index are satisfactory for a plastic lens requiring high-level transparency.

According to the production method of the present invention, the compound bonding molecules each other via a urea bond is reacted with a polythiol compound used as a raw material monomer, and therefore an urethane optical member that has a high refractive index and excellent transparency may be produced even though MDI and TDI containing the compound are used as a raw material monomer.

DESCRIPTION OF EMBODIMENTS

Urethane Optical Member

The urethane optical member of the present invention contains at least one kind of structures represented by the following formulae (1) and (2) in a structure constituting the optical member.

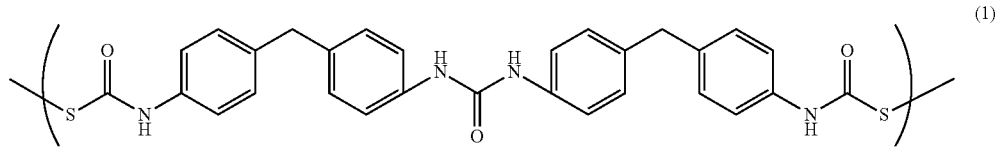

(1)

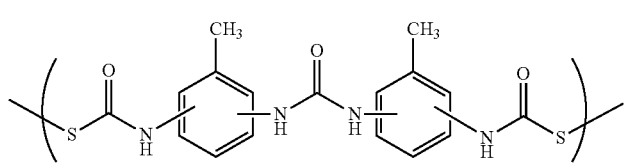

(2)

The structures represented by the formulae (1) and (2) are derived from the compound represented by the following formula (1-1) and the compound represented by the following formula (2-1) (which each may be hereinafter referred to as a dimer), which are compounds formed of two molecules of MDI or TDI respectively that are bonded via a urea bond. The structures represented by the formulae (1) and (2) are formed through reaction of the dimers and a polythiol compound, as described later for the production process.

(i) 4,4'-Diphenylmethane diisocyanate and the compound represented by the following formula (1-1) are present as a mixture, and herein, the compound represented by the following formula (1-1) in the mixture of (i) may be expressed as a dimer in MDI. Similarly, (ii) tolylene diisocyanate and the compound represented by the following formula (2-1) are present as a mixture, and herein, the compound represented by the following formula (2-1) in the mixture of (ii) may be expressed as a dimer in TDI.

The compound represented by the following formula (2-1) in TDI is at least one kind selected from the six kinds of compounds formed of the 2,4-isomer and the 2,6-isomer of TDI.

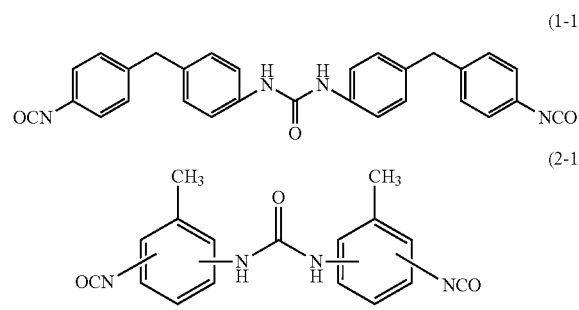

By incorporating the dimer in TDI or MDI to form the structure represented by the formula (1) or (2) into the structure constituting the optical member, the dimer is prevented from being deposited in the resulting optical member, thereby enhancing the transparency thereof.

Method for Producing Urethane Optical Member

The method for producing a urethane optical member including the structure represented by the formula (1) or (2) of the present invention includes reacting the dimer and a polythiol compound. According to the production method of the present invention, the dimer is reacted with a polythiol compound to convert the dimer to the aforementioned structure, which is included in the optical member through a covalent bond, thereby providing transparency.

The dimer can be reacted with the polythiol compound in the form contained in MDI or TDI without isolation.

Content of Dimer in MDI or TDI

The dimer is formed in such a manner that an amine is formed by reacting a part of the isocyanate group with, such as, water contained in the air, and the amine is reacted with another isocyanate group of another molecule to form a urea bond. Therefore in the case where MDI or TDI is used as a raw material monomer, the monomer may contain a certain amount of the dimer depending on the storage condition thereof.

According to the production method of the present invention, however, MDI or TDI that contains the dimer in an amount of 0.001% by mass or more, and further 0.005% by mass or more, may be used as the raw material monomer.

In the case where the content of the dimer contained in MDI or TDI is too much, such a factor may be considered as severe deterioration of MDI or TDI itself, and it is not preferred to use MDI or TDI as a raw material in such a condition. In the present invention, accordingly, the upper limit of the content of the dimer in MDI or TDI used as the raw material monomer is preferably 0.05% by mass, more preferably 0.01% by mass, and further preferably 0.005% by mass.

Content of Dimer in Monomer Composition

The optical member of the present invention may be obtained, by using at least MDI or TDI, and a polythiol compound as a raw material monomer, by polymerizing a monomer composition of which a content of the dimer of 0.0005% by mass or more. Even when the content of the dimer in the composition is 0.0005% by mass or more, and further 0.001% by mass or more, an optical member having excellent transparency may be obtained by the production method of the present invention.

In the case where MDI and TDI are used in combination, the content referred herein is the total content of the dimers.

The upper limit of the content of the dimer is preferably 0.03% by mass, more preferably 0.006% by mass, and further preferably 0.003% by mass, with respect to the total amount of the monomer composition. If the upper limit is 0.03% by mass, the transparency may not be deteriorated due to such factors as deterioration of MDI or TDI itself, thereby achieving both a high refractive index and transparency simultaneously.

The ratio of the dimer with respect to the total amount of the monomer composition is a value calculated from the amount of the dimer contained in MDI or TDI used and the amount of MDI or TDI used. The content of the dimer in MDI or TDI may be measured by gel permeation chromatography.

Reaction of Dimer and Polythiol Compound

In the reaction of the dimer and the polythiol compound, the dimer in the form of solid has poor reactivity with the polythiol compound, and thus is necessarily reacted under severe reaction condition, and therefore, the dimer is preferably dissolved in the polyisocyanate compound as a raw material and reacted with the polythiol. For reacting the dimer in the dissolved state with the polythiol, it is preferred to perform a step of dissolving the dimer in advance.

The step of dissolving the dimer is not particularly limited as far as the dimer is dissolved thereby, and examples thereof include a method of dissolving the dimer contained in MDI or TDI in another polyisocyanate compound, and a method of dissolving the dimer contained in MDI or TDI under heating without mixing with another polyisocyanate compound, since these methods may not require complicated procedures.

In the method of dissolving the dimer in another polyisocyanate compound, the dimer may be dissolved by mixing MDI or TDI containing the dimer with another polyisocyanate compound, followed by stirring.

Another polyisocyanate compound, in which the dimer is dissolved, is not particularly limited as far as it is a raw material monomer used, and is preferably a polyisocyanate compound that has good compatibility with the dimer.

Examples of the polyisocyanate compound having good compatibility with the dimer include 1,6-hexamethylene diisocyanate, o-xylylene diisocyanate, m-xylylene diisocyanate, α,α,α',α'-tetramethylxylylene diisocyanate, isophorone diisocyanate, bis(isocyanatomethyl)cyclohexane and bis(isocyanatomethyl)dicycloheptane. Among these, 1,6-hexamethylene diisocyanate, o-xylylene diisocyanate and m-xylylene diisocyanate are preferred due to good compatibility thereof.

For further ensuring the dissolution of the dimer, the dimer may be mixed and stirred with another polyisocyanate compound under heating by such a method as a heating bath.

While the temperature on heating may vary depending on the content of the dimer in the mixture and may not be determined unconditionally, the temperature is preferably from 50 to 120° C., and more preferably from 70 to 100° C., and the heating time is preferably from 5 to 30 minutes, and more preferably from 5 to 10 minutes, under an inert gas atmosphere, for preventing heat deterioration.

The dimer contained in MDI or TDI may be dissolved under heating without mixing with another polyisocyanate compound. In this method, MDI or TDI containing the dimer may be sufficiently heated by such a method as a heating bath.

While the temperature on heating may vary depending on the content of the dimer and may not be determined unconditionally, the temperature is preferably from 50 to 120° C., and more preferably from 70 to 100° C., and the heating time is preferably from 5 to 30 minutes, and more preferably from 5 to 10 minutes, under an inert gas atmosphere, for preventing heat deterioration.

The reaction of the MDI dimer or the TDI dimer with the polythiol compound mainly proceeds in the polymerization process of the monomer composition.

In the case where the urethane optical member is a plastic lens, a mold casting polymerization method is preferably used, in which, for example, a mixture of MDI or TDI containing the dimer mixed therein, or both of them, and the polythiol compound, another raw material monomer, and additives depending on necessity is cast and polymerized in a mold containing a combination of a glass or metal mold and a resin gasket. The polymerization temperature and the polymerization time in this case may be from 40 to 90° C. for initiating the polymerization and then increased to 110 to 130° C. over a period of from 5 to 10 hours, followed by heating for a period of from 10 to 30 hours for curing and molding, while they may vary depending on the kind of the raw material used.

Raw Material Monomer

The raw materials used in the method for producing a urethane optical member of the present invention may include a polyisocyanate compound including MDI and TDI and a polythiol compound, and may also include a polymerizable monomer that is ordinarily used as a raw material monomer for an optical member.

Examples of the polyisocyanate compound include a polyisocyanate compound including an aromatic ring, an aliphatic polyisocyanate compound and an alicyclic polyisocyanate compound.

Examples of the polyisocyanate compound including an aromatic ring other than MDI and TDI include 1,3-phenylene diisocyanate, 1,4-phenylene diisocyanate, o-xylylene diisocyanate, m-xylylene diisocyanate, p-xylylene diisocyanate, ethylphenylene diisocyanate, isopropylphenylene diisocyanate, diethylphenylene diisocyanate, diisopropylphenylene diisocyanate, trimethylbenzene triisocyanate, benzene triisocyanate and mesitylene triisocyanate. The polyisocyanate compound having an aromatic ring may be used solely, or two or more kinds thereof may be used.

Examples of the aliphatic polyisocyanate compound include 1,6-hexamethylene diisocyanate, lysine ester triisocyanate and 1,3,6-hexamethylene triisocyanate, and examples of the alicyclic polyisocyanate compound include isophorone diisocyanate, bis(isocyanatomethyl)cyclohexane, dicyclohexylmethane 4,4'-diisocyanate, 1,3-cyclohexane diisocyanate, 1,4-cyclohexane diisocyanate, 1,2-bis(isocyanatomethyl)cyclohexane, 1,3-bis(isocyanatomethyl)cyclohexane, 1,4-bis(isocyanatomethyl)cyclohexane, 1,3,5-tris(isocyanatomethyl)cyclohexane, bicycloheptane triisocyanate, and bis(isocyanatomethyl)dicycloheptane. The aliphatic and alicyclic polyisocyanate compounds may be used solely, or two or more kinds thereof may be used.

Examples of the polythiol compound include ethylene glycol bis(2-mercaptoacetate), pentaerythritol tetrakis(2-mercaptoacetate), dipentaerythritol hexakis(2-mercaptoacetate), pentaerythritol tetrakis(3-mercaptopropionate), trimethylolethane tris(2-mercaptoacetate), trimethylolethane tris(3-mercaptopropionate), trimethylolpropane tris(2-mercaptoacetate), trimethylolpropane tris(3-mercaptopropionate), dichloroneopentyl glycol bis(3-mercaptopropionate), dibromoneopentyl glycol bis(3-mercaptopropionate), 2,5-bismercaptomethyl-1,4-dithiane, 4,5-bismercaptomethyl-1,3-dithiane, bis[(2-mercaptoethyl)thio]-3-mercaptopropane, bis(mercaptomethyl)-3,6,9-trithiaundecane-1,11-dithiol, 1,2-bis(mercaptomethylthio)benzene, 1,3-bis(mercaptomethylthio)benzene, 1,4-bis(mercaptomethylthio)benzene, 1,2-bis(mercaptoethylthio)benzene, 1,3-bis(mercaptoethylthio)benzene, 1,4-bis(mercaptoethylthio)benzene, 1,2,3-tris(mercaptomethylthio)benzene, 1,2,4-tris(mercaptomethylthio)benzene, 1,3,5-tris(mercaptomethylthio)benzene, 1,2,3-tris(mercaptoethylthio)benzene, 1,2,4-tris(mercaptoethylthio)benzene, 1,3,5-tris(mercaptoethylthio)benzene, 1,2,3,4-tetrakis(mercaptomethylthio)benzene, 1,2,3,5-tetrakis(mercaptomethylthio)benzene, 1,2,4,5-tetrakis(mercaptomethylthio)benzene, 1,2,3,4-tetrakis(mercaptoethylthio)benzene, 1,2,3,5-tetrakis(mercaptoethylthio)benzene, 1,2,4,5-tetrakis(mercaptoethylthio)benzene, bis(mercaptomethyl)sulfide, bis(mercaptoethyl)sulfide, bis(mercaptopropyl)sulfide, bis(mercaptomethylthio)methane, bis(2-mercaptoethylthio)methane, bis(3-mercaptopropylthio)methane, 1,2-bis(mercaptomethylthio)ethane, 1,2-bis(2-mercaptoethylthio)ethane, 1,2-bis(3-mercaptopropylthio)ethane, 1,3-bis(mercaptomethylthio)propane, 1,3-bis(2-mercaptoethylthio)propane, 1,3-bis(3-mercaptopropylthio)propane, 1,2-bis(2-mercaptoethylthio)-3-mercaptopropane, 3,4-thiophenedithiol, tetrahydrothiophene-2,5-bismercaptomethyl, 2,5-dimercapto-1,3,4-thiadiazole and 2,5-bismercaptomethyl-1,4-dithiane. The polythiol compound may be used solely, or two or more kinds thereof may be used.

Mixing Ratio

The mixing ratio of the polyisocyanate compound containing MDI and TDI, and the polythiol compound may be generally from 0.5 to 2.0, and preferably from 0.95 to 1.05, in terms of the molar ratio of NCO group/SH group. When the molar ratio of NCO group/SH group is 0.95 or more, substantially no unreacted NCO group may remain, and when the molar ratio is 1.05 or less, the reaction may be completed with substantially no unreacted SH group. An ideal polymer having less unreacted groups may be obtained with the range.

In addition to the raw material monomer described above, various additives used in an optical member, such as a polymerization catalyst, a mold releasing agent, an antioxidant, an ultraviolet ray stabilizer and a coloration preventing agent, may be used depending on necessity.

Examples of the urethane optical member of the present invention thus produced in the aforementioned manner include a plastic lens for spectacles, a camera and the like, a prism, an optical fiber, a substrate for a recording medium used in an optical disk, a magnetic disk and the like, and an optical filter attached to a display device of a word processor and the like.

Particularly preferred examples of the optical member include, due to the excellent transparency without turbidity and fog thereof, a plastic lens, particularly a plastic lens for spectacles requiring an especially high refractive index.

EXAMPLE

The present invention will be described with reference to Examples, but the present invention is not limited to the Examples.

In Examples and Comparative Examples, the physical properties were evaluated by the following manners.
(1) Appearance A mixture containing raw materials mixed was visually observed immediately before polymerization, and a lens obtained after polymerization was visually observed under fluorescent lamp in a darkroom, thereby evaluating the color and the transparency of the appearance before polymerization and the appearance after polymerization.
Evaluation Standard A: Colorless and transparent with no white turbidity found before and immediately after polymerization B: Substantially colorless and transparent with substantially no white turbidity found before and immediately after polymerization C: Opaque with white turbidity before and immediately after polymerization
(2) Transmittance A visible light luminous transmittance at a wavelength of from 380 to 780 nm was measured with a spectrophotometer, U3410 (manufactured by Hitachi, Ltd.). The lens thus produced had a thickness of 2.00 mm.
(3) Refractive Index The resulting lens was measured for a refractive index at 25° C. with an e-line with a precision refractometer (KPR-2000) manufactured by Shimadzu Device Corporation.

Example 1

13.47 g of MDI having a content of an MDI dimer of 0.001% by mass, which was a result of quantitative determination for the oligomer components with gel permeation chromatography (GPC-104, manufactured by Showa Denko K.K.), was charged in a 100-mL recovery flask and stirred at 50° C. under purging with nitrogen for 5 minutes for dissolving the MDI completely.

Then, 0.015 g of butoxyethyl acid phosphate as a mold releasing agent and 0.012 g of dimethyl tin dichloride as a polymerization catalyst were added thereto, 7.44 g of 2,5-bismercaptomethyl-1,4-dithiane (DMMD) and 4.07 g of pentaerythritol tetrakis(2-mercaptoacetate) (PETMA) were mixed therewith, and they were stirred under reduced pressure of 0.13 kPa (1.0 torr) for 2 minutes to prepare a mixture. The mixture was polymerized with a temperature program having an initial temperature of 50° C. and a final temperature of 120° C. over 24 hours to provide a lens. The results of the evaluation of physical properties with respect to the example are shown in Table 1.

Example 2

13.48 g of MDI having a content of an MDI dimer of 0.005% by mass, which was a result of quantitative determination for the oligomer components with gel permeation chromatography (GPC-104, manufactured by Showa Denko K.K.), was charged in a 100-mL recovery flask and stirred at 70° C. under purging with nitrogen for 5 minutes for dissolving the MDI completely.

Then, 0.015 g of butoxyethyl acid phosphate as a mold releasing agent and 0.012 g of dimethyl tin dichloride as a polymerization catalyst were added thereto, 7.44 g of 2,5-bismercaptomethyl-1,4-dithiane (DMMD) and 4.07 g of pentaerythritol tetrakis(2-mercaptoacetate) (PETMA) were mixed therewith, and they were stirred under reduced pressure of 0.13 kPa (1.0 torr) for 2 minutes to prepare a mixture. The mixture was polymerized with a temperature program having an initial temperature of 70° C. and a final temperature of 120° C. over 24 hours to provide a lens. The results of the evaluation of physical properties with respect to the example are shown in Table 1.

Example 3

13.48 g of MDI having a content of an MDI dimer of 0.01% by mass, which was a result of quantitative determination for the oligomer components with gel permeation chromatography (GPC-104, manufactured by Showa Denko K.K.), was charged in a 100-mL recovery flask and stirred at 80° C. under purging with nitrogen for 5 minutes for dissolving the MDI completely.

Then, 0.015 g of butoxyethyl acid phosphate as a mold releasing agent and 0.012 g of dimethyl tin dichloride as a polymerization catalyst were added thereto, 7.44 g of 2,5-bismercaptomethyl-1,4-dithiane (DMMD) and 4.07 g of pentaerythritol tetrakis(2-mercaptoacetate) (PETMA) were mixed therewith, and they were stirred under reduced pressure of 0.13 kPa (1.0 torr) for 2 minutes to prepare a mixture. The mixture was polymerized with a temperature program having an initial temperature of 80° C. and a final temperature of 120° C. over 24 hours to provide a lens. The results of the evaluation of physical properties with respect to the example are shown in Table 1.

Example 4

13.48 g of MDI having a content of an MDI dimer of 0.03% by mass, which was a result of quantitative determination for the oligomer components with gel permeation chromatography (GPC-104, manufactured by Showa Denko K.K.), was charged in a 100-mL recovery flask and stirred at 80° C. under purging with nitrogen for 5 minutes for dissolving the MDI completely.

Then, 0.015 g of butoxyethyl acid phosphate as a mold releasing agent and 0.012 g of dimethyl tin dichloride as a polymerization catalyst were added thereto, 7.44 g of 2,5-bismercaptomethyl-1,4-dithiane (DMMD) and 4.07 g of pentaerythritol tetrakis(2-mercaptoacetate) (PETMA) were mixed therewith, and they were stirred under reduced pressure of 0.13 kPa (1.0 torr) for 2 minutes to prepare a mixture. The mixture was polymerized with a temperature program having an initial temperature of 80° C. and a final temperature of 120° C. over 24 hours to provide a lens. The results of the evaluation of physical properties with respect to the example are shown in Table 1.

Comparative Example 1

13.50 g of MDI having a content of an MDI dimer of 0.2% by mass, which was a result of quantitative determination for the oligomer components with gel permeation chromatography (GPC-104, manufactured by Showa Denko K.K.), was charged in a 100-mL recovery flask.

While the MDI was in the form of powder without performing the step of dissolving the dimer, 0.015 g of butoxyethyl acid phosphate as a mold releasing agent and 0.012 g of dimethyl tin dichloride as a polymerization catalyst were added thereto, they were stirred at 80° C. under purging with nitrogen for 5 minutes, 7.44 g of 2,5-bismercaptomethyl-1,4-dithiane (DMMD) and 4.07 of pentaerythritol tetrakis(2-mercaptoacetate) (PETMA) were mixed therewith, and they were stirred under reduced pressure of 0.13 kPa (1.0 torr) for 2 minutes to prepare a mixture.

The mixture, which was turbid white, was polymerized with a temperature program having an initial temperature of 80° C. and a final temperature of 120° C. over 24 hours to provide a lens. The results of the evaluation of physical properties with respect to the comparative example are shown in Table 1. The transmittance was not measured, and the refractive index was not able to be measured, due to the white turbidity.

Example 5

13.48 g of MDI having a content of an MDI dimer of 0.05% by mass, which was a result of quantitative determination for the oligomer components with gel permeation chromatography (GPC-104, manufactured by Showa Denko K.K.), was charged in a 100-mL recovery flask and stirred at 80° C. under purging with nitrogen for 5 minutes for dissolving the MDI completely.

Then, 0.015 g of butoxyethyl acid phosphate as a mold releasing agent and 0.012 g of dimethyl tin dichloride as a polymerization catalyst were added thereto, 7.44 g of 2,5-bismercaptomethyl-1,4-dithiane (DMMD) and 4.07 g of pentaerythritol tetrakis(2-mercaptoacetate) (PETMA) were mixed therewith, and they were stirred under reduced pressure of 0.13 kPa (1.0 torr) for 2 minutes to prepare a mixture. The mixture was polymerized with a temperature program having an initial temperature of 80° C. and a final temperature of 120° C. over 24 hours to provide a lens. The results of the evaluation of physical properties with respect to the example are shown in Table 1.

Comparative Example 2

13.48 g of MDI having a content of an MDI dimer of 0.05% by mass, which was a result of quantitative determination for the oligomer components with gel permeation chromatography (GPC-104, manufactured by Showa Denko K.K.), was charged in a 100-mL recovery flask.

While the MDI was in the form of powder without performing the step of dissolving the dimer, 0.015 g of butoxyethyl acid phosphate as a mold releasing agent and 0.012 g of dimethyl tin dichloride as a polymerization catalyst were added thereto, and they were mixed at 30° C. under purging with nitrogen for 5 minutes. Subsequently, 7.44 g of 2,5-bismercaptomethyl-1,4-dithiane (DMMD) and 4.07 of pentaerythritol tetrakis(2-mercaptoacetate) (PETMA) were mixed therewith.

The mixture contained MDI in the form of solid, as a result of powder undissolved, and the liquid thereof was turbid white. The mixture was polymerized with a temperature program having an initial temperature of 80° C. and a final temperature of 120° C. over 24 hours to provide a lens. The results of the evaluation of physical properties with respect to the comparative example are shown in Table 1. The transmittance was not measured, and the refractive index was not able to be measured, due to the white turbidity.

Example 6

6.73 g of MDI having a content of an MDI dimer of 0.05% by mass, which was a result of quantitative determination for the oligomer components with gel permeation chromatography (GPC-104, manufactured by Showa Denko K.K.), was charged in a 100-mL recovery flask, to which 4.56 g of 1,6-hexamethylene diisocyanate (HDI) was then added, and the mixture was stirred at 80° C. under purging with nitrogen for 5 minutes for dissolving them completely.

Then, 0.015 g of butoxyethyl acid phosphate as a mold releasing agent and 0.012 g of dimethyl tin dichloride as a polymerization catalyst were added thereto, 7.44 g of 2,5-bismercaptomethyl-1,4-dithiane (DMMD) and 4.07 g of pentaerythritol tetrakis (2-mercaptoacetate) (PETMA) were mixed therewith, and they were stirred under reduced pressure of 0.13 kPa (1.0 torr) for 2 minutes to prepare a mixture. The mixture was polymerized with a temperature program having an initial temperature of 80° C. and a final temperature of 120° C. over 24 hours to provide a lens. The results of the evaluation of physical properties with respect to the example are shown in Table 1.

Comparative Example 3

6.73 g of MDI having a content of an MDI dimer of 0.05% by mass, which was a result of quantitative determination for the oligomer components with gel permeation chromatography (GPC-104, manufactured by Showa Denko K.K.), was charged in a 100-mL recovery flask, to which 4.56 g of 1,6-hexamethylene diisocyanate (HDI) was then added. Immediately thereafter without dissolving the HDI in the dimer, 0.015 g of butoxyethyl acid phosphate as a mold releasing agent and 0.012 g of dimethyl tin dichloride as a polymerization catalyst were added thereto, they were stirred at 30° C. under purging with nitrogen for 3 minutes, and then 7.44 g of 2,5-bismercaptomethyl-1,4-dithiane (DMMD) and 4.07 g of pentaerythritol tetrakis(2-mercaptoacetate) (PETMA) were mixed therewith.

The mixture contained MDI in the form of solid as similar to Comparative Example 2, and the liquid thereof was turbid white. The mixture was polymerized with a temperature program having an initial temperature of 80° C. and a final temperature of 120° C. over 24 hours to provide a resin. The results of the evaluation of physical properties with respect to the comparative example are shown in Table 1. The transmittance was not measured, and the refractive index was not able to be measured, due to the white turbidity.

TABLE 1

|  |  | Example 1 | Example 2 | Example 3 | Example 4 | Comparative Example 1 | Example 5 | Comparative Example 2 | Example 6 | Comparative Example 3 |
|---|---|---|---|---|---|---|---|---|---|---|
| Monomer composition (g) | MDI | 13.47 | 13.48 | 13.48 | 13.48 | 13.50 | 13.48 | 13.48 | 6.73 | 6.73 |
| | HDI | — | — | — | — | — | — | — | 4.56 | 4.56 |
| | DMMD | 7.44 | 7.44 | 7.44 | 7.44 | 7.44 | 7.44 | 7.44 | 7.44 | 7.44 |
| | PETMA | 4.07 | 4.07 | 4.07 | 4.07 | 4.07 | 4.07 | 4.07 | 4.07 | 4.07 |
| Content of dimer in monomer (% by mass) | | 0.001 | 0.005 | 0.01 | 0.03 | 0.2 | 0.05 | 0.05 | 0.05 | 0.05 |
| Content of dimer in monomer composition (% by mass) | | 0.00054 | 0.0027 | 0.0054 | 0.0162 | 0.108 | 0.0270 | 0.0270 | 0.030 | 0.030 |
| Dissolving condition of dimer | Temperature (° C.) | 50 | 70 | 80 | 80 | — | 80 | — | 80 | — |
| | Stirring time (min) | 5 | 5 | 5 | 5 | — | 5 | — | 5 | — |
| Polymerization temperature change (° C.) | | 50 → 120 | 70 → 120 | 80 → 120 | 80 → 120 | 80 → 120 | 80 → 120 | 80 → 120 | 80 → 120 | 80 → 120 |
| Evaluation | Appearance | A | A | A | B | C | B | C | B | C |
| | Transmittance | 88 | 88 | 87 | 87 | — | 87 | — | 88 | — |
| | Refractive index | 1.668 | 1.669 | 1.669 | 1.669 | — | 1.669 | — | 1.641 | — |

It is understood from Table 1 that colorless and transparent lenses are obtained in Examples 1 to 6, and thus the dimer is incorporated as the particular structure into the structure constituting the lens, through reaction with the polythiol compound. It is also understood that in Comparative Examples 1 to 3, the resulting lenses are opaque, and thus the dimer is not reacted with the polythiol compound but is deposited as an impurity.

It is further understood from Example 5 and Comparative Example 2, and Example 6 and Comparative Example 3 that a lens having excellent transparency and a high refractive index may be obtained when the dimer is dissolved and reacted with the polyisocyanate compound, even with the same dimer content.

INDUSTRIAL APPLICABILITY

The urethane optical member and the method for producing the same of the present invention provide an optical member that has excellent transparency without turbidity or fog and a high refractive index, and thus are useful in the field of a plastic lens, particularly a plastic lens for spectacles.

The invention claimed is:

1. A method for producing a urethane optical member in which a monomer composition comprising at least one kind selected from (i) 4,4'-diphenylmethane diisocyanate and a dimer compound represented by the following formula (1-1) dissolved therein and (ii) tolylene diisocyanate and a dimer compound represented by the following formula (2-1) dissolved therein, another polyisocyanate compound and a polythiol compound are polymerized:

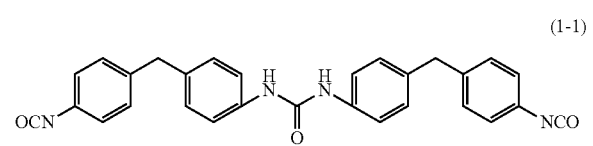

(1-1)

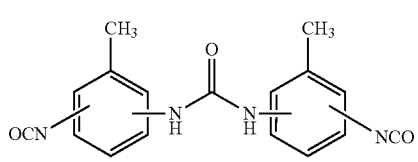

(2-1)

the method comprising mixing and stirring a composition comprising said at least one kind with said another polyisocyanate compound under heating, thereby forming an isocyanate mixture,
and polymerizing the isocyanate mixture with said polythiol compound,
wherein a content of the dimer compound of formula (1-1) in the item (i) is 0.005% by mass or less, or a content of the dimer compound represented by the formula (2-1) in the item (ii) is 0.005% b, mass or less.

2. The method for producing a urethane optical member according to claim 1, wherein the temperature on heating is from 50 to 120° C.

3. The method for producing a urethane optical member according to claim 1, wherein the another diisocyanate is 1,6-hexamethylene diisocyanate, o-xylylene diisocyanate or m-xylylene diisocyanate.

4. The method for producing a urethane optical member according to claim 1, wherein the temperature on heating is from 70 to 100° C.

5. The method for producing a urethane optical member according to claim 1, wherein the heating time is from 5 to 30 minutes.

6. The method for producing a urethane optical member according to claim 1, wherein the heating time is from 5 to 10 minutes.

7. The method for producing a urethane optical member according to claim 1, wherein a content of the compound represented by the formula (1-1) in the item (i) is 0.001% by mass or more, or a content of the compound represented by the formula (2-1) in the item (ii) is 0.001% by mass or more.

* * * * *